July 3, 1934.  H. C. PRESTON  1,964,797

PORTABLE ROTARY ELECTRIC TOOL

Filed Oct. 8, 1930  2 Sheets-Sheet 1

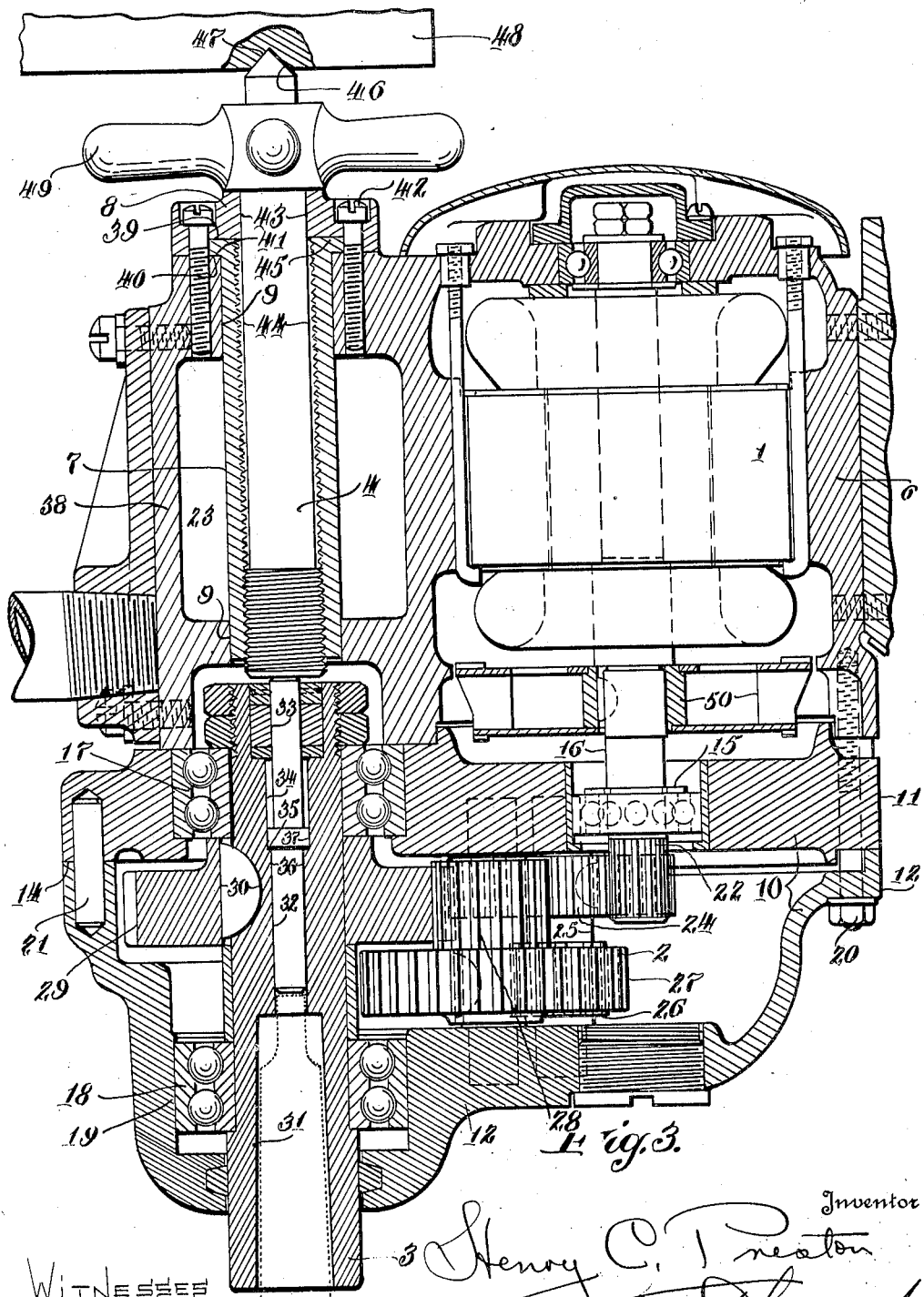

Patented July 3, 1934

1,964,797

UNITED STATES PATENT OFFICE 1,964,797

PORTABLE ROTARY ELECTRIC TOOL

Henry C. Preston, Towson, Md., assignor to The Black and Decker Manufacturing Company, Towson, Md., a corporation of Maryland Application October 8, 1930, Serial No. 487,265

1 Claim. (Cl. 77—6)

In the construction of portable electric drills and similar rotary tools as wrenches, reamers, valve grinders and the like, it has been customary to locate the spindle and gear casing substantially in alignment with the motor which made a considerable overall length an essential feature of the tool. The excessive length of the regular type of rotary drill has been found to interfere with its use in many instances and has considerably decreased its range of utility.

In the production of the improved type of tool this construction has been rearranged so that the entire casing, including both the motor housing and gear casing, is of a length but little more than the essential length of the motor housing and little more than two thirds the length of the previous tools, the spindle being located at the side of the motor which provides for the considerable decrease of overall length already mentioned and further provides in connection with this decreased length for a power feed in direct alignment with the spindle, which power feed can be utilized as a means for knocking out the drill bit or other tool from the bit socket.

In the accompanying drawings I have illustrated a portable power driven rotary tool of the drill type, constructed in accordance with the invention and embodying the features thereof in the preferred form.

In the drawings:

Figure 3 is a vertical central section on the line 3—3 in Figure 2 and on the scale of Figure 2.

Figure 1:
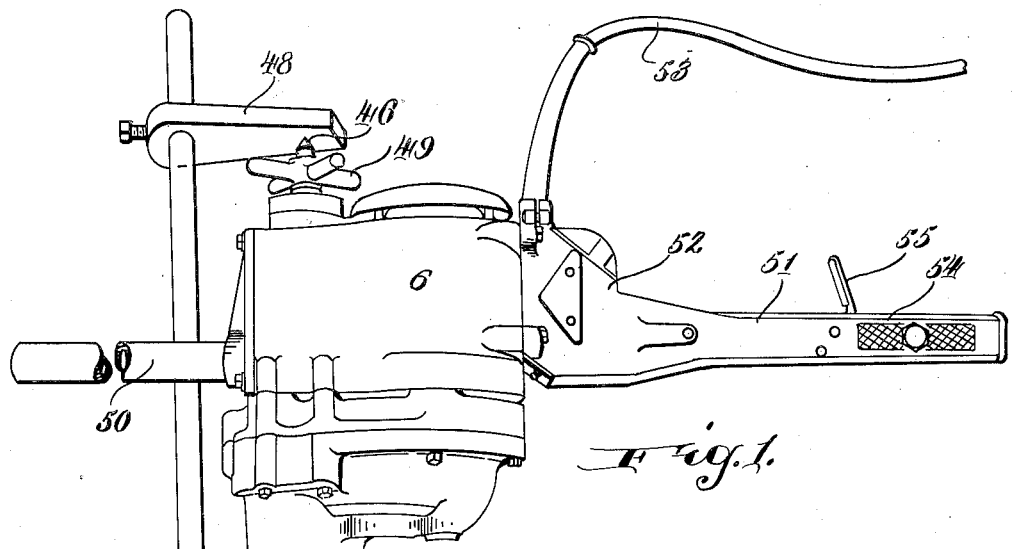
Figure 1 is a side elevation of the tool showing its external appearance.
Figure 2:
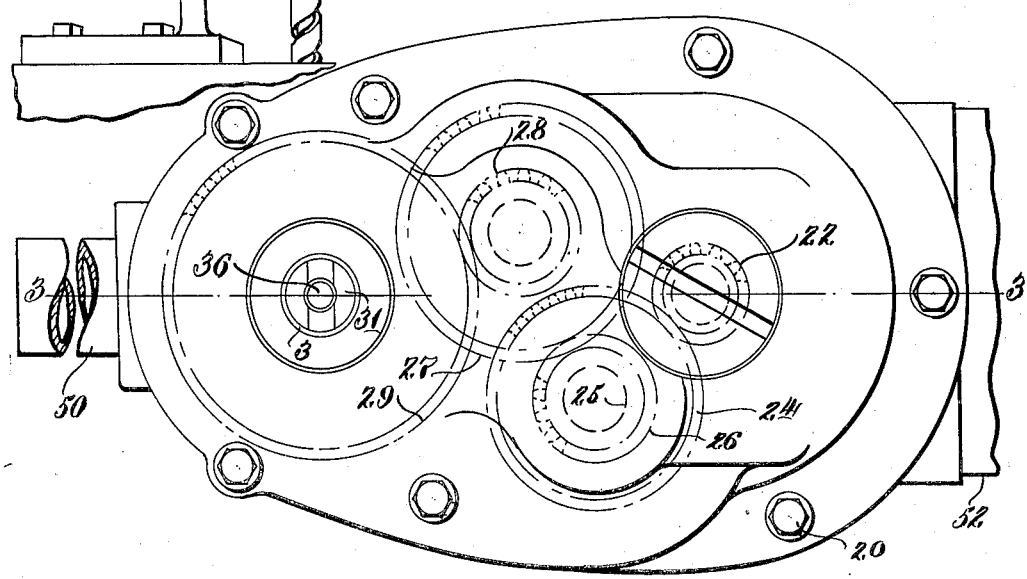
Figure 2 is a top plan view of the same on a larger scale, portions being broken away for convenience of illustration.

Referring to the drawings by numerals, each of which is used to indicate the same or similar parts in the different figures, the construction shown comprises an electric motor 1, reducing gearing 2, spindle 3, and feed and knockout screw 4 at the side of the motor and in alignment with the spindle.

More particularly, the motor 1 is enclosed within a suitable motor housing 6, which also carries the feed screw 4 at the side of the motor within a suitable feed nut 7 provided with a thrust and bearing collar 8 whereby the feed nut 7 is held in a suitable bore 9 formed in the housing for this purpose. The collar also serves as a bearing for the screw shaft as hereinafter described.

The construction also includes gear casing 10, which may be treated as formed in two parts, i. e. a bearing support 11 and gear casing proper 12, meeting on a plane of contact 14 at right angles to the spindle. The bearing support 11 contains and supports the bearing 15 for the motor shaft 16 and the upper bearing 17 for the spindle, the lower bearing 18 for the spindle is supported in the lower section 12 of the gear casing in a suitable seat formed therein at 19. The sections of gear casing 11 and 12 are secured to the motor housing by bolts 20 which in connection with the positioning pins 21 serve also to hold the gear casing sections 11 and 12 in their assembled position.

The spindle 3 is driven from the motor shaft 16 by way of the reducing gear train 2 consisting of a small pinion 22 on the motor shaft which meshes with an idler gear 24 mounted on a suitable shaft 25 which carries secured thereto a pinion 26 which in turn meshes with a larger gear 27 carrying a pinion 28, which, in turn, drives the large gear 29 on the spindle 3. The spindle is provided at its lower end with the usual tapered socket 31, and is further provided with a longitudinal bore 32 extending upwardly through the spindle to the upper end of the latter where it is bushed at 33. The bore 32 is also enlarged at a point well above the lower end at 34, providing an upwardly disposed shoulder 35, and the bushing 33 acts as a guide and stop.

Seated in the bore 32, 33, 34 is a knockout pin 36 having a free sliding fit in the portions 32, 33, and having a boss or shoulder 37, which slides freely in the enlarged portion 34 of the bore and bears at its lower edge in the lower position of the pin against the shoulder 35. Thus the pin is free to move upwardly from the position shown, which is its lowermost position and is thrust upwardly from this position by the insertion of the end of the tool or bit in the tapered socket 31, it being understood that the feed and knockout screw 4 is shown in its lowermost or knockout position from which it is normally slightly raised to admit the tool or bit.

The knockout feed screw 4, as already described is mounted in a feed nut 7 which, in turn, is supported in a suitable bore 9 formed in a lateral projection 38 of the motor housing which is preferably hollowed out at 23 to reduce the amount of metal in the tool, the bore 9 occurring above and below the hollowed portion 39 and the nut 7 being elongated so that it is conveniently seated in both portions of the bore extending from one to the other. The feed nut 7 is enlarged and shouldered at its upper end at 39, the downwardly disposed surface 40 of the shoulder and the corresponding upwardly disposed surface 41 of the casing being suitably finished to provide a seat for the nut. The nut is held in position by a bearing collar 8 which furnishes a bearing at 43 for the screw shaft 44, the collar 8 being chambered on its lower side at 45 to take over the upper enlarged or shouldered end of the nut and held in position on the casing by screws 42.

The upper end of the feed and knockout screw 4 is suitably finished and chamfered at 46 to engage a corresponding cavity 47 in an overhead support shown fragmentarily at 48, which serves as a feeding abutment where a mechanical feed of the drill is desired, it being understood that it is used with equal facility without the feed. The screw shaft 44 is also provided at its upper end with a handwheel 49, by which it is manually engaged and operated.

Figure 1 shows the tool as provided with radially projecting controller arms 50, 51, the latter being formed integrally with a switch casing 52 to which is connected the electrical conducting cord 53. The controller arm 51 has a suitable grip portion 54 adjacent to which in convenient arrangement is shown a switch lever 55.

In the operation of the tool, the motor as already described drives the spindle 3 by way of the reducing train 2, the motor being cooled by the fan 50 and controlled by means of the switch lever 55. The tool is held and directed by the handles 50, 51 in a manner similar to the operation of any manually portable power driven rotary tool.

When, however, a mechanical feed is desired, the overhead support 48 is brought into operation, being adjusted into alignment with the hole or other work to be operated upon. Under these circumstances the drill or other tool is fed into the work by rotating the feed screw 4 counter clockwise, i. e., in the unscrewing direction, the threads shown being righthanded. The end 46 of the feed screw shaft or spindle 44 being seated in the socket 47 of the overhead support 48, the entire tool and hence the bit is fed downwardly into the work.

The feed screw 4 serves in addition to the feeding function the function of a knockout screw. When the bit is inserted in the socket 31, the pin 36 is forced upwardly raising the shoulder 37 of the pin from the shoulder 35 inside the hole in the spindle and when it is desired to remove the bit, the feed screw 4 is merely turned downwardly forcing the pin 36 downwardly to a corresponding extent and releasing the bit from the socket.

It is also of interest that the spindle bearings 17 and 18 are above and below the drive gear 29 which is mounted on the spindle to drive the same. This prevents vibration and gives the bearing a longer life.

The short overall length of the tool which results from the arrangement described makes it possible to align it in many situations when tools of the previous design could not be used.

What I claim as new and desire to secure by Letters Patent is:

The combination in a rotary power driven tool of a motor, a motor housing, a feed screw and an internally threaded sleeve in which the screw is engaged supported on the housing at the side of the motor, said support comprising means at the upper end of the sleeve for securing the same to the upper wall of the motor housing and a seat at a lower point in the motor housing in which the lower end of the sleeve is secured, a spindle in line with the feed screw, a bearing support secured to the motor housing and carrying a bearing for the motor shaft and a bearing for the spindle, a drive gear on the spindle below the said bearing, a gear casing enclosing said gear and secured to said bearing support, a train of gears in said gear casing connecting said motor to said drive gear, a bearing for the spindle in said gear casing and below the drive gear, the spindle having a tool socket and a pin slidably mounted in the spindle above the socket and adapted to enter the same and also to project above the spindle whereby the feed screw is utilized to knock out the tool bits.

HENRY C. PRESTON.